United States Patent [19]

Tauscher

[11] 4,180,110

[45] Dec. 25, 1979

[54] HANDSAW WITH SPECIALIZED CUTTING TEETH

[76] Inventor: Heinrich E. Tauscher, Bergstrasse 7, 8441 Furth-Oberalteich, Fed. Rep. of Germany

[21] Appl. No.: 915,589

[22] Filed: Jun. 15, 1978

[51] Int. Cl.² .............................................. B27B 21/00
[52] U.S. Cl. ..................................... 145/31 R; 76/112
[58] Field of Search ........................ 145/31 R; 76/112

[56] References Cited

U.S. PATENT DOCUMENTS

| | | | |
|---|---|---|---|
| 2,546,947 | 3/1951 | Miller | 145/31 R |
| 2,727,545 | 12/1955 | Dawson | 145/31 R |
| 4,043,367 | 8/1977 | Knuth | 145/31 R |

FOREIGN PATENT DOCUMENTS 526757  6/1956  Canada ................................ 145/31 R Primary Examiner—Robert L. Spruill
Assistant Examiner—J. T. Zatarga
Attorney, Agent, or Firm—Charles A. Laff; J. Warren Whitesel; Howard B. Rockman

[57] ABSTRACT

A handsaw has a main blade and an auxiliary cutting blade with specialized fingers. The cutting blade is held tautly between two points disposed on opposite ends of the main blade. Interlocking teeth prevent the two blades from springing apart without interfering with the tautness of the cutting blade. The vertical projection of the cross section of the two blades is the same as the vertical projection of one blade alone, so that the two combined saw blades easily follow their own kerf.

11 Claims, 9 Drawing Figures

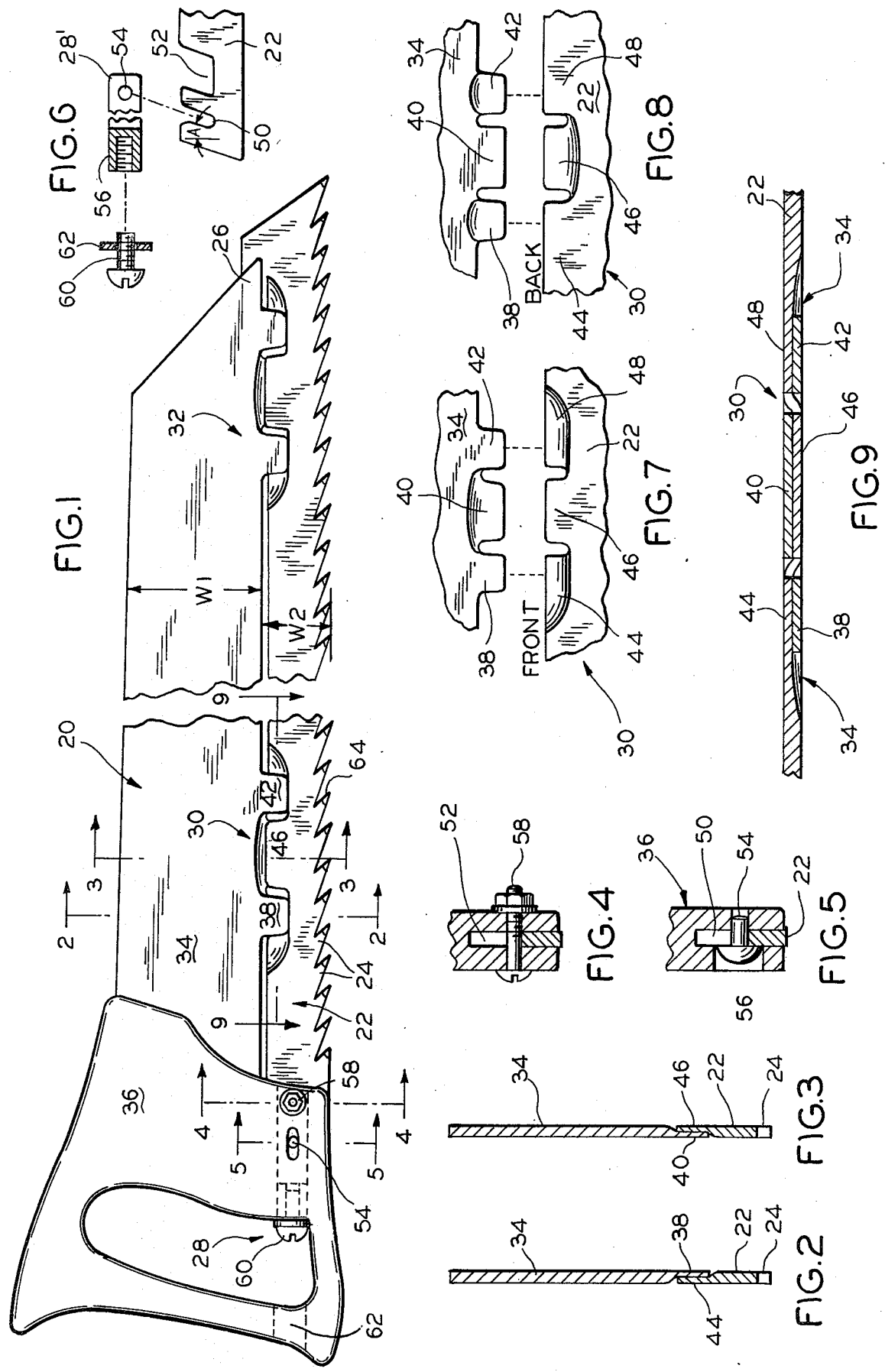

HANDSAW WITH SPECIALIZED CUTTING TEETH

This invention relates to handsaws having specialized saw blades and more particularly to handsaws having blades with carbide-tipped teeth.

The cutting edges of tools have have dramatically improved with advances in manufacturing processes and in metallurgy. Carbide-tipped, steel blades are exemplary of such improved saws. For implementation and utilization of many of these new and improved cutting edges, it is necessary to depend very strongly upon highly specialized manufacturing, tooling and production techniques. For example, carbide tips are welded to steel saw blanks by means of automatic welding machines having extremely sophisticated capabilities.

These automatic machines are relatively expensive production tooling which very often depend upon means for feeding toothed blanks through automatic transport mechanisms for welding or otherwise attaching a tip of unique material at the end of each tooth on a preformed steel saw blank. This means that the blanks must be fairly standard since it would be too costly to provide a separate transport mechanism for each of many different and mutually incompatible shapes, sizes, and forms. Accordingly, any practical system for utilizing these newer saw blades must be adapted to perform all functions with a single shape of saw blank.

For these reasons, it has been common practice to provide only the "more popular" forms of saws with the newer cutting edges. For example, a circular saw or a band saw has many uses and may be widely sold to many users. Therefore, it is economically feasible to establish automatic production lines for making these circular or band saw blade forms. On the other hand, there are many other fields where there are pressing needs for saws with the newer cutting edges, but the total markets are so small that it would not be feasible to install an entire production line merely to serve them. Therefore, these fields of speciality saws have been totally neglected and the users must continue to employ their old tools.

An exemplary field requiring—but not having—a saw with a newer cutting edge is the masonry or plaster wall construction industry. These walls may be made of plaster tile, or they may be lathed and plastered, or they may be dry wall construction. For obvious reasons, it is necessary to use a handsaw to cut a doorway, for example, into such an existing plaster wall. When sawing through the plaster wall, the abrasive material grinds off the tips and ruins the conventional saw blades. Since a carbide-tipped saw would not become dull as quickly, it would last much longer and, therefore, would be a substantial step forward in the art.

This problem of a need for specialized saw blades suggests that it should be possible to attach a standardized band saw blade to a specialized support and thereby create a new saw for a specialized purpose. The question then becomes one of how can such a specialized support be an adequate mechanical structure and still be such an easily used device, without becoming either too awkward or too unwiedly. For example, the usual hacksaw type of structure will not easily pass through a slot or kerf cut by the saw blade. A very complex attaching structure might be too difficult to assemble or unable to remain securely interconnected when in operation.

Accordingly, an object of the invention is to provide new and improved means for and methods of using specialized band saws on hand tools. Here, an object is to provide two-blade structures having a more positive interlocking for holding the two blade parts more securely engaged with each other. In particular, an object is to provide a pair of interlocking blades which function as a single unit and yet are easy to assemble and disassemble.

Yet another object of the invention is to adapt uniquely toothed band saw blades made on standardized automated production machinery for use on specialized tool supports. Here, an object is to provide new and unique uses for specialized saw blades made on automatic machine tools, without requiring new production equipment for each new and unique saw use.

Still another object of the invention is to interconnect a pair of blades in a manner which does not cause the two blades to become more tightly wedged together, responsive to use.

Yet another object of the invention is to provide a carbide-tipped hand tool for sawing masonry or plaster walls.

In keeping with an aspect of the invention, these and other objects are accomplished by providing a handsaw having a main blade assembly and a band saw cutting blade with specialized cutting teeth. The main blade assembly has a single locking point at its extremity, opposite the handle. An adjustable clamp is provided at the handle end of the main blade. On each of the two blades, and interposed between these two ends of the main blade, are successive sets of interlocking fingers which are hollow ground on opposite sides of the two blades. Thus, these interlocking fingers may interleave with each other when the blades are interconnected. These interlocking fingers do not wedge in the longitudinal direction; therefore, a use of the saw has no effect upon the interlocking pressures between the two blades. A continued use of the two-blade saw has no effect upon the ease or difficulty of disconnecting the cutting blade from the main blade.

The nature of a preferred embodiment of the invention may be understood from the attached drawing, wherein:

FIG. 1 is a side elevation view of the inventive handsaw;

FIG. 2 is a cross section of the two blades, taken along line 2—2 of FIG. 1;

FIG. 3 is a cross section of the two blades, taken along line 3—3 of FIG. 1;

FIG. 4 is a cross-sectional view of the handle and a blade, taken along line 4—4 of FIG. 1;

FIG. 5 is a cross-sectional view of a blade clamp, taken along line 5—5 of FIG. 1;

FIG. 6 is a side elevation view (partially in cross section) of the inventive blade and its associated clamp;

FIG. 7 is a fragmentary view showing one side of a set of interlocking fingers;

FIG. 8 is a similar fragmentary view showing the other side of the same set of interlocking fingers; and FIG. 9 is a horizontal cross section taken along line 9—9 of FIG. 1.

The inventive handsaw comprises a main saw blade assembly 20 and a band saw blade 22 having cutting teeth 24 on one side of it. The main blade assembly has a single locking point 26 on one end and an adjustable clamp 28 at the other end. A number of interlocking fingers are provided in at least one location in both blades at 30,32 to longitudinally stabilize the two blades relative to each other, so that they do not flex apart.

In greater detail, the main blade assembly 20 comprises a blade 34 having a handle 36 which may be constructed in the manner of any suitable and conventional handsaw, which may be adapted to perform the intended function. For example, if the saw of FIG. 1 is intended to be used as a plaster or masonry saw, the main blade assembly 20 is constructed as most plaster or masonry saws are constructed.

However, unlike a conventional saw blade, the main blade assembly 20 has a width which is reduced from normal by an amount W2 so that the remaining width of blade 34 is W1. The lower edge of main blade 34 does not contain conventional, cutting saw teeth. Instead, it is formed with sets of interlocking fingers 30,32, one at locations spaced at discrete intervals along the length of the blades.

As here shown, each set 30,32 of interlocking fingers comprises three, rather broad, spaced parallel, finger-like projections 38,40,42 (FIGS. 7, 8). In greater detail, the main blade 34 has a series of three interlocking fingers 38, 40, 42 dependent therefrom. Likewise, the cutting blade 22 has a series of three interlocking fingers 44,46,48 formed thereon, in vertical alignment with the interlocking fingers 30 on the main blade 34.

The two blades 22,34 are alternately hollow ground on opposite sides, at successive ones of the interlocking fingers. Thus, the "front" side of the main blade 34 (seen in FIG. 7) has been hollow ground at the middle tooth 40. On the same "front" side of the cutting blade 22, the two outside fingers 44,48 have been hollow ground. On the "back" (seen in FIG. 8), the reverse is true since the two outside fingers 38,42 of the main blade 34 have been hollow ground while the center fingers 46 has been hollow ground on the back of cutting blade 22.

As best seen in FIGS. 2, 3, and 9, each of the interlocking fingers 30 has spaced parallel sides or faces. Therefore, they do not tend to become tightly wedged together as the saw is used. In fact, the interlocking fingers 30, 32 have no longitudinal holding force whatsoever, acting along the length of the saw blades. On the other hand, this face-to-face relationship between the interleaved and interlocking fingers 30,32 securely holds together the two blades in the horizontal plane so that they cannot spring apart along the length of the saw blade. Still the vertical cross section of the combined blades of the total saw (FIGS. 2, 3) is no different than it would be if the saw were entirely conventional. Therefore, the blade easily follows through its own kerf. Also, there is no danger that a longitudinal movement of one blade, relative to the other, could cause a wedging wherein the cross section (FIGS. 2, 3) spreads so that a side of an interlocking finger 30,32 might snag upon an edge of the kerf.

The outer end of the cutting blade 22 has a complementary locking point, which is here shown as a recess with contours which exactly match the contours of the locking point 26. The opposite or inner end (FIG. 6) of the cutting blade 22 has a pair of coves 50,52 which are set at the angle A. The first cove 50 is adapted to receive a pin 54, which projects horizontally from sliding member 56 controlled by screw 60. The second cove 52 receives a guide pin 58 which passes through the handle 36.

The outside end of saw handle 36 includes a hole 62 for receiving the blade end of a screwdriver. That screwdriver engages a slot in a head of a screw 60 which abuts against a washer 62 resting against the handle 36. Thus, as the head of screw 60 is rotated one way, the sliding member 56 is driven into the handle 36. If it is rotated in an opposite direction, screw 60 is pulled out of the handle.

The operation of the saw should now be clear. The main saw assembly 34 is placed on its back. The recess at the tip of the cutting blade 22 is fitted over the locking point 26 at the front of the main blade. The hollow ground interlocking fingers 30,32 are brought together, with the coves 50,52 fitting over the pins 54,58, respectively. Then the screw 60 is turned to retract the member 56 and pin 54, which becomes captured in the bottom of slot 50. The cutting blade 22 is drawn taut, much as a bowstring, between the two points formed by locking point 26 and pin 54. The two blades 22,34 easily slide relative to each other in the area of the interlocking fingers 30,32 so that there is no question of a slack blade, at any point along the length of the saw.

It should be noted that the interlocking fingers are on alternate sides of an edge of each of the main and cutting blades along at least part of the length thereof, the fingers of one blade being sequentially, reversely positioned relative to the fingers of the other blade for preventing the blades from springing apart and without effect upon the tautness of the cutting blade. The interlocking fingers have only longitudinally spaced parallel contacting faces and their thicknesses are reduced so that the fingers on the main and cutting blades interfit face-to-face without wedging together, the combined cross-sectional thickness of the main and cutting blade having the same cross-sectional thickness, whereby the combined blades follow their own kerf.

The cutting blade 22 is here shown as a band saw blade having carbide tips on every steel saw tooth. However, it should be understood that any other specialized band saw blade may also be used. The particular carbide-tipped blade that I contemplate using may be manufactured on an automatic machine as disclosed in a copending application entitled "Method of Making Carbide Tipped Tools," Ser. No. 915,909, filed June 16, 1978, by Gerhard Kolb and Henrich Tauscher (Our File No. 12506).

The conventional band saw blade is then stamped out on a punch press to have the shape and contours shown in FIGS. 1, 6. Next, the blade is hollow ground in the region of the interlocking teeth 30,32. There is no need for any special tooling other than the cutting dies used in the punch press. Moreover, it is possible to use any suitable band saw blade. Thus, the invention enables any form of band saw to be used as a handsaw.

Those who are skilled in the art will readily perceive how to modify the system. Therefore, the appended claims are to be construed to cover all equivalent structures.

I claim:

1. A handsaw comprising an elongated main blade means having one end shaped to form a first locking point which is no thicker than the main blade means and a handle at the other end, cutting blade means having a second locking point which is no thicker than the cutting blade at a first end, said second locking point being complementary to and fitting onto the first locking point, whereby said locking points pass freely through the kerf of the saw, clamp means on said handle for engaging a second end of said cutting blade means and drawing said cutting blade means taut between said locking point and said handle on said main blade, there being no longitudinal holding forces acting along the length of said blade between said locking point and said handle, and interlocking fingers on alternate sides of an edge of each of said main and cutting blade means along at least part of the length thereof, the fingers of one blade being sequentially, reversely positioned relative to the fingers of the other blade for preventing them from springing apart without effect upon the tautness of said cutting blade means, said interlocking fingers having only longitudinally spaced parallel contacting faces and reduced thicknesses so that the fingers on the main and cutting blade interfit face-to-face without wedging together, the combined cross-sectional thickness of said main and cutting blade means having the same cross-sectional thickness, whereby said combined blades follow their own kerf.

2. The saw of claim 1 wherein said interlocking fingers comprise broad, spaced parallel finger-like projections which are hollow ground on opposite sides of alternate fingers on said blade means.

3. The saw of claim 2 wherein there are a plurality of sets of said interlocking fingers, each of the sets of said interlocking fingers comprising three fingers.

4. The saw of claim 3 wherein said cutting blade means comprises a band saw blade having specialized cutting teeth.

5. The saw of claim 4 wherein said specialized cutting teeth are carbide-tipped, steel teeth.

6. A method of making specialized handsaws from standardized band saw blades, said method comprising the steps of:
  a. forming an elongated main blade with a handle on one end, said blade having a cross section which is no thicker than the width of the kerf of said saw;
  b. shaping said main blade to have a locking point on one end and interlocking fingers on alternate sides of an edge of said main blade along at least part of the length thereof, said fingers having longitudinally spaced parallel faces and being approximately half as thick as said main blade and located between said locking point and said handle;
  c. shaping a cutting blade having a cross section which is no thicker than the kerf of said saw, having a contour complementary to the contour of said locking point, the complementary contour fitting onto the locking point such that both together pass freely through the kerf of the saw, and complementary interlocking fingers on alternate sides of an edge of said cutting blade along at least part of the lenght thereof, said fingers having longitudinally spaced parallel faces and being approximately half as thick as said cutting blade and located between the complementary contour and the opposite blade end, the arrangement of the cutting blade interlocking fingers along at least part of the length thereof being sequentially reversely positioned relative to that of the main blade interlocking fingers,
  d. positioning the said edge of the cutting blade adjacent the said edge of the main blade such that the interlocking fingers of each blade interfit face-to-face with only the said longitudinally spaced parallel faces in contact with each other, there being no longitudinal holding forces acting along the length of said blades between said locking point and said handle, the interlocking fingers preventing the blades from springing apart without effect upon the tautness of said cutting blade and the interfit being such that the fingers do not wedge together as they contact only upon their parallel faces; and,
  e. drawing said cutting blade taut between said locking point and said handle.

7. The method of claim 6 wherein there are three of said interlocking fingers forming a set positioned in at least one location between said locking point and said handle, each of the interlocking fingers being approximately half as thick as its respective blade, and alternately located on opposite sides of said blades.

8. The method of claim 7 wherein each interlocking finger has spaced parallel sides so that no wedging can occur between interlocked fingers.

9. A handsaw having two elongated blades of approximately equal thickness throughout their entire cross section, means for holding one of said blades taut between two points on opposite ends of the other blade, there being no longitudinal holding forces acting along the length of said blades between the two points, and interlocking fingers on alternate sides of an edge of each of said blades along at least part of the length thereof, the fingers of one blade being sequentially reversely positioned relative to the fingers of the other blade, for preventing them from springing apart without effect upon the tautness of said one blade, said interlocking fingers having only longitudinally spaced parallel contacting faces and reduced thicknesses so that the fingers on each blade interfit face-to-face without wedging together, the combined cross-sectional thickness of said blades having the same cross-sectional thickness, whereby said combined blades follow their own kerf.

10. The handsaw of claim 9 wherein one of said two blades is a carbide-tipped band saw.

11. The handsaw of claim 10 wherein said two blades form a masonry saw.

* * * * *